Patented June 5, 1928.

1,672,361

UNITED STATES PATENT OFFICE.

OSCAR H. BERGER, OF BIRMINGHAM, ALABAMA, ASSIGNOR TO WM. P. McDONALD CONSTRUCTION COMPANY, OF FLUSHING, NEW YORK, A CORPORATION OF NEW YORK.

COLD BITUMINOUS PAVING COMPOSITION AND METHOD OF MAKING SAME.

No Drawing.   Application filed August 21, 1925. Serial No. 51,717.

This invention relates to bituminous surfacing compositions and more particularly to such compositions that are prepared from asphaltic substances, and which can be readily handled and laid while cold.

An object of this invention is to provide improved compositions of the type described, and a process of manufacture thereof whereby the same may be prepared and utilized in a convenient and economical manner.

In its more specific aspects one of the objects of this invention is to provide a process and products of the type described which are particularly adapted for use and incorporation in road construction whereby the products, while possessing all of the good qualities inherent in the heretofore known bituminous paving mixtures, have additional advantageous characteristics.

Other objects of the invention will in part be obvious and will in part appear hereinafter.

The invention accordingly comprises the several steps and the relation and order of one or more of such steps with respect to each of the others, and the products possessing the features, properties, and the relation of constituents, which are exemplified in the following detailed disclosure, and the scope of the application of which will be indicated in the claims.

In the early art of road construction each contractor prepared in its entirety the asphalt cement necessary for the work at hand, for example, by refining the crude asphalt, if necessary, or by taking a previously refined asphalt such as refined Trinidad, and fluxing the same by heating to from 250–350° F., with an oil residuum containing little or no easily volatilized oils and having a low Baumé and a high flash point, whereby an asphalt cement having a penetration of about 50–90 at 77° F., 100 grams, 5 seconds, was obtained. The asphalt cement was then mixed with sand or other mineral aggregate as desired, with or without filler, which had been heated to the same or even higher temperatures, to produce a paving mixture which it was necessary to maintain in a heated condition until used, and to lay hot so that it might be given the final rolling before the temperature thereof had fallen below approximately 225° F.

Subsequent developments in the art permitted the contractor to obtain the asphalt cement in a ready-fluxed state, or to purchase a so-called "oil asphalt" such as is obtained from the distillation of asphaltic oils. Both these types of asphalt cement have, however, approximately the same physical characteristics, and because of their tendency to cool and lump, present certain inherent disadvantages, namely: the mixing plant must be situated near the work; skilled labor must be employed; heated tools and rollers are essential; special care and treatment is required in joining the lay of one day to that of the preceding day; reheating of the surface is required for patching or repairing surface cuts, which latter also require entirely new material to be used; there is a high loss factor due to cooling of portions of the mix in handling, particularly in rainy weather; and, when the pavement is finally laid there is a marked tendency toward brittleness in cold weather, and the pavement must be closed to traffic for a considerable time after laying, in order to allow the same to cool and solidify.

In an effort to avoid certain of such disadvantages, it has from time to time been suggested to treat the fluxed asphalt cement or the aggregate with certain light or volatile oils, commonly referred to as, "temporary liquefiers", such as naptha or gasoline, with a view to so cutting or thinning the flux that the resulting mixture may be laid at a lower temperature or cold. Because of the cutting effect of the "temporary liquefiers" such mixtures are usually referred to as "cut-backs". These mixtures are limited in their application and use, however, due to the fact that if they are not laid substantially immediately after mixing, the temporary liquefiers volatilize to such an extent that the cement again becomes too thick and the mixture lumps badly and must be reheated and recut before application to the road surface. Another disadvantage which renders the use of such mixes prohibitive, is the relatively high cost of the "temporary liquefiers", which in some cases amounts to approximately as much or more than that of the asphalt cement used.

Similar attempts to obtain a cold-lay, asphalt pavement mixture have been made by using an emulsion type of asphalt cement, for example, one which has been emulsified with water by the aid of an alkali or soap. Such mixtures have been but little used, however, since it has been found that the life of pavement produced therefrom is relatively short, and both this type and the "cut-back" type require a considerable time to harden sufficiently to sustain traffic. To reduce this latter time factor and to increase the body of the mix, resort has been had to the use of considerable amounts of filler, as, for example, clay, limestone dust, etc., but the resulting products have been of an inferior character, particularly in regard to their cohesiveness and life qualities.

Perhaps the best type of cold-lay pavement heretofore known is represented by a number of natural rock-asphalts found in certain portions of the southern United States. Generally speaking these comprise intimate admixtures of mineral aggregate and a natural asphalt which has a consistency such that it may be worked cold, but when laid and rolled soon hardens into a servicable roadway. Aside from the limited supply, the non-availability, and the high cost of such rock-asphalts, the principal objection to their use has been found to be the non-uniformity thereof, since the percentage of the bitumen to aggregate varies in different veins and even in the different parts of the same vein from 5 up to 15% or more. This variation in the amount of bitumen and also certain variations in the physical characteristics of the cement has led to numerous attempts to blend and cut back such rock-asphalts, but these have been largely unsuccessful, and the art is still almost entirely dependent upon the standard hot-mix type of pavement.

In the practice of the present invention not only have the undesirable characteristics of the former paving compositions been eliminated, and the desirable ones retained, but also certain additional desirable characteristics result which have never before been attained. By the proper selection and incorporation of materials, the compositions may be mixed at a plant located at any convenient place and at substantially any distance from the paving operation; the mixture may be stored for any reasonable length of time and will retain its "life" (i. e., its lustre tendency to crawl, etc.), without danger of lumping; it may be laid cold; repairs, surface cuts and joints from day to day may be made without reheating, any material removed being reutilized, if desired, by merely rebreaking and retamping in place; unskilled labor may be used; hot tools and rollers are unnecessary; and the mixture in bulk is substantially unaffected by adverse weather conditions, and when laid and compressed produces a long lived and resilient pavement which will not become brittle in cold weather or soften in hot weather, and which may be opened to traffic substantially immediately after rolling.

The asphalt cement prepared in accordance with the present invention may be used in producing any of the usual types of asphalt pavements, such as sheet asphalt, asphalt concrete, black-base, macadam and the like, or if desired may be used as a water-proofing agent for roofing or for similar purposes. As will be pointed out hereinafter, the temperatures used in fluxing the cement and mixing with the aggregate are substantially lower than those necessary in the usual hot-mix types of pavement, thus reducing considerably the amount of heat necessary for these operations, and accordingly if used for penetration work the temperatures are correspondingly lower.

A paving mixture or mastic made by the use of the improved asphalt cement need not be laid immediately, but may be stored in bulk in piles where it will remain in its original "live" condition for months without appreciable lumping. It has been found that in such storing the surface of the pile will tend to set to a shallow depth, as, for example, to about ¼ of an inch, thus forming a jacket which seals off the principal mass of the material, thereby retaining therein the more volatile constituents of the mix and when the bulk is broken up and spread, these more volatile constituents reflux or re-condition the partially set surface portions, thus making the whole mass available for use. Moreover, when the paving has been laid and rolled its exposed surface will again set or harden substantially immediately, thereby becoming stable to a degree sufficient to sustain traffic, while the under portion or main body thereof assumes sufficient consistency to withstand all traffic loads but retains its life and remains somewhat malleable for a considerable length of time. It does not, however, become sufficiently rigid to fracture even in the coldest weather, and has the characteristic that it can be opened up and the removed portions reutilized when necessary.

To these ends, an important feature of the present invention, as regards the preparation of the improved asphalt cement lies in the use of a hard and relatively pure asphalt substance, as, for example, an asphalt containing about 60% or over of bitumen, and having a penetration of from 0 to 3 or 4 at 115° F., 100 grams, 5 seconds. Another important feature is the use of fluxing oils containing a higher percentage of the more volatile oils than are used in the usual hot-mix practice where, on account of the high temperatures used it is possible, with due regard to safety, to employ only fluxes of the oil residuum type having low volatility and high flash points.

An asphaltic substance which has been found to be particularly adapted for use in the present invention, is a native asphalt having the properties described, and which is known as "Cuban" asphalt. This asphalt is of such a type that it may be used without preliminary refining, and hence gives resultant decreased operating costs. As a fluxing agent, petroleums of the asphaltic, semi-asphaltic or paraffine base type, either in the crude or slightly topped form (for example, to the gasoline or kerosene stage) have been found to be suitable, as, for example, Mexican petroleum. These fluxing oils should be used in substantially their natural state, as it is generally recognized that when an oil has been fractionated into its constituents, such as gasoline, naphtha, kerosene, light fuel oils, etc., a subsequent remixing of these constituents will produce a mixture of markedly different characteristics than those of the original oil. This is particularly true as regards their adaptability as fluxes useful in the carrying out of the present invention. This phenomenon is most probably due to a substantial change in the polymerization and/or a change in inter-relation of the constituents of the natural oil. Such oils in substantially their natural state are therefore hereinafter referred to as "fresh oils," to distinguish from certain remixed fractions such as heavy fluxes plus gasoline, etc., which have been suggested for use in making "cutback" mixes. It is to be understood, however, that the term "fresh oils" does not exclude oils from which the moisture or even the top fractions such as gasoline or kerosene have been removed, as long as the principal and characteristic constituents of the remaining oil are in substantially their natural polymerized and/or inter-relational state. The use of hard asphalt of the type described gives to the finished mastic sufficient body to insure proper adhesion and compacting when rolled and the use of a flux containing the more volatile constituents of the oil in their natural state tend to retard the rigidification of the mastic and allow it to be stored, handled and laid in a cold state, as described.

In the preparation of the improved asphalt cement the asphaltic substance is fluxed with the petroleum oil in approximately equal proportions by weight. The proper proportions to be used may in any case be readily ascertained according to the asphalt and fluxing materials used, and the prospective disposal of the final product. For example, if the asphalt cement is to be incorporated with the aggregate at once, but the resulting mastic is not to be used for some time, the proportion of fluxing oils should be slightly increased, and it has sometimes been found to be desirable to increase the oil component up to as high as one-half again as much as the asphalt component.

Owing to the composition of the fluxing oils used and the consistency of the resulting asphalt cement, the temperature of the mixture at the time of fluxing, or at any subsequent time, should preferably not exceed a point which would cause any substantial loss of the light volatile elements of the oil, as for example, not over 200–250° F., and the asphaltic material is added slowly to the heated fluxing oil preferably in a comminuted state to facilitate fluxing, while the mixture is being agitated either mechanically or by a suitable gaseous medium, such as air, in order to prevent scorching and further to facilitate fluxing.

An asphalt cement prepared as above described will be of such a consistency that its degree of penetration cannot readily be measured by the usual methods at 77° F., 100 grams, 5 seconds. Generally speaking, however, the consistency is such that at 115° F., it gives a float test of about 5 or 6 minutes, as compared to a float test of 25 or 30 minutes, required for the usual hot-mix asphalt cement under the same conditions.

If the asphalt cement is to be used in the preparation of sheet asphalt or asphaltic concrete, preferably dried sand, rock or other aggregate may be heated slightly to facilitate mixing as, for example, from 150 to 200° F. To this aggregate the asphalt cement is added and mixed in the usual manner and in substantially the usual amounts, as, for example, from 5–8%, and although a filler has been found not to be necessary, such may be added if desired to an amount up to about 5%.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A bituminous mixture composed of hard asphalt having a penetration not substantially in excess of 4 at 115° F., 100 grams, 5 seconds and "fresh oil" flux containing a substantial percentage of light volatiles, in such proportions as to form, when fluxed, an asphaltic cement adapted for mixing with an aggregate to form a cold-lay paving mixture.

2. An asphaltic cement adapted for the preparation of a cold-lay paving mixture, composed of hard asphalt having a penetration not substantially in excess of 4 at 115° F., 100 grams, 5 seconds fluxed with a "fresh oil" containing a substantial percentage of light volatiles.

3. An asphaltic cement adapted for the preparation of a cold-lay paving mixture, composed of hard native asphalt having a penetration not substantially in excess of 4 115° F., 100 grams, 5 seconds, fluxed with a "fresh oil" containing a substantial percentage of light volatiles.

4. An asphaltic cement adapted for the preparation of a cold-lay paving mixture composed of hard native asphalt having a penetration not substantially in excess of 4 at 115° F., 100 grams, 5 seconds fluxed with a slightly topped "fresh oil" containing a substantial percentage of light volatiles.

5. An asphaltic cement adapted for the preparation of a cold-lay paving mixture composed of hard native asphalt having a penetration not substantially in excess of 4 at 115° F., 100 grams, 5 seconds fluxed with approximately an equal portion of a "fresh oil" containing a substantial percentage of light volatiles.

6. A process of making an asphaltic cement adapted for the preparation of a cold-lay paving mixture, which comprises fluxing until homogeneous, a hard asphalt having a penetration not substantially in excess of 4 at 115° F., 100 grams, 5 seconds with a "fresh oil" containing a substantial percentage of light volatiles, at a temperature below that a which any substantial portion of the light volatiles would be driven off.

7. A process of making an asphaltic cement adapted for the preparation of a cold-lay paving mixture which comprises fluxing until homogeneous, a hard native asphalt having a penetration not substantially in excess of 4 at 115° F., 100 grams, 5 seconds with a "fresh oil" containing a substantial percentage of light volatiles, at a temperature of about 200-250° F.

8. A process of making an asphaltic cement adapted for the preparation of a cold-lay paving mixture which comprises fluxing until homogeneous, a hard native asphalt having a penetration not substantially in excess of 4 at 115° F., 100 grams, 5 seconds with approximately an equal portion of a "fresh oil" containing a substantial percentage of light volatiles, at a temperature below that at which any substantial portion of the light volatiles would be driven off.

9. A process of making an asphaltic cement adapted for the preparation of a cold-lay paving mixture which comprises fluxing until homogeneous, a hard native asphalt having a penetration not substantially in excess of 4 at 115° F., 100 grams, 5 seconds with at least an equal portion of a slightly topped "fresh oil" containing a substantial percentage of light volatiles, at a temperature of about 200-250° F.

10. A process of making a cold-lay bituminous paving mixture which includes preparing an asphalt cement by fluxing until homogeneous, a hard native asphalt having a penetration not substantially in excess of 4 at 115° F., 100 grams, 5 seconds with a "fresh oil" containing a substantial percentage of light volatiles, at a temperature of about 200-250° F., and mixing the cement with a mineral aggregate.

11. A process of making a cold-lay bituminous paving mixture which includes preparing an asphalt cement by fluxing until homogeneous, a hard native asphalt having a penetration not substantially in excess of 4 at 115° F., 100 grams, 5 seconds with a "fresh oil" containing a substantial percentage of light volatiles, at a temperature of about 200-250° F., and mixing the cement with a mineral aggregate at a temperature not materially in excess of the fluxing temperature.

12. An artificially prepared composition of matter of substantially uniform consistency and having the properties of natural rock-asphalt, which is prepared from a hard native asphalt having a penetration not substantially in excess of 4 at 115° F., 100 grams, 5 seconds a "fresh oil" flux containing a substantial percentage of light volatiles, and a mineral aggregate.

13. In an artificially prepared road surfacing material, in combination, an intimate mixture of mineral aggregate and asphaltic cement, said cement including hard asphalt having a penetration not substantially in excess of 4 at 115° F., 100 grams, 5 seconds, and a flux composed substantially of a "fresh oil" containing a substantial percentage of light volatiles, the flux and the asphalt being so proportioned and of such character as permits storing the mixture in bulk with only superficial hardening and with retention of the "life" of the principal mass for an extended period without appreciable lumping.

14. In an artificially prepared road surfacing material, in combination, an intimate mixture of mineral aggregate and asphaltic cement, said cement including hard asphalt having a penetration not substantially in excess of 4 at 115° F., 100 grams, 5 seconds, and a flux composed substantially of a "fresh oil" containing a substantial percentage of light volatiles, the flux and the asphalt being so proportioned of such a character as permits the mixture to be spread and rolled while cold to form a road surface capable of substantially immediately sustaining traffic.

15. In an artificially prepared road surfacing material, in combination, an intimate mixture of mineral aggregate and asphaltic cement, said cement including hard asphalt having a penetration not substantially in excess of 4 at 115° F., 100 grams, 5 seconds, and a flux composed substantially of a "fresh oil" containing a substantial percentage of light volatiles, the flux and the asphalt being so proportioned and of such a character as permits a cold lay of said mixture, which when rolled is substantially immediately capable of sustaining traffic and which by evaporation of a portion of said volatile oil from the mass adjacent the road surface, forms a hard surface crust while the under portions of the mass remain resilient.

In testimony whereof I affix my signature.

OSCAR H. BERGER.